United States Patent Office 3,452,019
Patented June 24, 1969

3,452,019
1-PHENYLALKYL-TETRAHYDRO-HALO-
SULFAMYL-QUINAZOLINONE
Bola Vithal Shetty, Rochester, N.Y., assignor to Wallace
& Tiernan Inc., East Orange, N.J., a corporation of
Delaware
No Drawing. Continuation-in-part of application Ser. No.
517,995, Jan. 3, 1966. This application Nov. 16, 1967,
Ser. No. 683,450
The portion of the term of the patent subsequent to
Dec. 26, 1984, has been disclaimed and dedicated
to the Public
Int. Cl. C07d 51/44; A61k 27/00
U.S. Cl. 260—256.5      8 Claims

ABSTRACT OF THE DISCLOSURE

A 1,2,3,4-tetrahydro-halo-sulfamyl-quinazolinone having diuretic properties, characterized by having in the 3-position a substituted or unsubstituted aryl or aralkyl group and by having in the 1-position a substituted or unsubstituted phenylalkyl group.

This application is a continuation, in part, of applicant's co-pending application Ser. No. 517,995, filed Jan. 3, 1966, now U.S. Patent 3,360,518, the disclosure of which is hereby incorporated by reference.

The invention relates to diuretic quinazolinone compounds. More particularly, the invention relates to 1,2,3,4-tetrahydro-sulfamyl-quinazolinone compounds.

In accordance with this invention, 1,2,3,4-tetrahydro-sulfamyl-quinazolinone compounds have, in the 3-position, a substituted or unsubstituted aryl or aralkyl group, and in the 1-position a substituted or unsubstituted phenylalkyl group. These compounds, like the compounds claimed in Ser. No. 517,995, now U.S. Patent No. 3,360,-518, which have a hydrogen or alkyl group in the 1-position, are effective diuretics.

The compounds of this invention are preferably of the following formula:

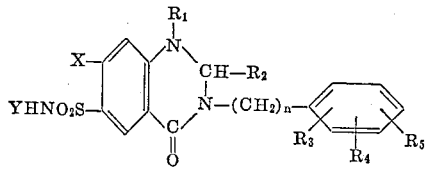

or the pharmaceutically acceptable salts thereof, in which X is halogen or trifluoromethyl, Y is hydrogen or loweralkyl, $R_1$ is phenylloweralkyl or substituted phenylloweralkyl, especially substituted by Cl, $NH_2$, OH, $OCH_3$, $CH_3$, $C_2H_5$, $SO_2NH_2$, $NHCH_3$, $N(CH_3)_2$, $R_2$ is hydrogen, loweralkyl, loweralkoxyalkyl, loweralkenyl, loweralkynyl, lowercycloalkyl, lowercycloalkylloweralkyl, thioalkyl, including alkythioalkyl and benzylthioalkyl, alkylthio, phenylthio, halogen substituted alkyl, phenylalkyl or substituted phenylalkyl, especially where the phenyl substituent is hydroxy, loweralkoxy, loweralkyl, halogen, trifluoromethyl, sulfamyl, or amino; $R_3$ is hydrogen, loweralkyl, hydroxy, alkoxy, $NH_2$, $SO_2NH_2$, halogen or trifluoromethyl; $R_4$ and $R_5$ are any of $R_3$, and $n$ is an integer from 0–4.

In the above formula X is preferably chlorine or trifluoromethyl, but bromine and the other halogens are not precluded. $R_1$ is preferably benzyl. $R_2$ is preferably methyl or hydrogen. The thioalkyl, when used, is preferably a thioloweralkyl; the halogen of the halogen substituted alkyl is preferably chlorine.

Loweralkyl and loweralkoxy means alkyl and alkoxy radicals of no more than 8 carbon atoms in a straight chain; lowercycloalkyl means a cycloalkyl of not more than 8 methylene groups in the ring. The phenylalkyl is preferably benzyl. $R_3$, $R_4$, and $R_5$ may be any of the stated radicals in one or more of the ortho, meta or para positions. Preferably $R_3$ is methyl in the ortho position, also where sulfamyl is used it is preferably present in the meta or para position with methyl in the ortho position. The substituted phenyl of $R_2$ and the substituted aralkyl of $R_2$ are suitably substituted with hydroxy, alkoxy (preferably lower alkoxy), lower alkyl, halogen, $SO_2NH_2$, trifluoromethyl, and $NH_2$.

Specific suitable compounds of the above formula include:

1-benzyl-2-methyl-3-o-tolyl-6-sulfamyl-7-chloro-1,2,3,4-tetrahydro-4-quinazolinone;
1-benzyl-2-methyl-3-o-tolyl-6-sulfamyl-7-trifluoromethyl-1,2,3,4-tetrahydro-4-quinazolinone;
1-o-chlorobenzyl-3-o-tolyl-6-sulfamyl-7-chloro-1,2,3,4-tetrahydro-4-quinazolinone;
1-benzyl-2-ethyl-3-o-tolyl-6-sulfamyl-7-trifluoromethyl-1,2,3,4-tetrahydro-4-quinazolinone;
1-beta-phenylethyl-2-ethyl-3-o-tolyl-6-sulfamyl-7-chloro-1,2,3,4-tetrahydro-4-quinazolinone;
1-benzyl-2-methyl-3-o-tolyl-6-methylaminosulfonyl-7-chloro-1,2,3,4-tetrahydro-4-quinazolinone;
1-benzyl-2-methyl-3-(p-chlorophenyl)-6-sulfamyl-7-chloro-1,2,3,4-tetrahydro-4-quinazolinone;
1-β-phenylethyl-2-methyl-3-o-tolyl-6-methylaminosulfonyl-7-chloro-1,2,3,4-tetrahydro-4-quinazolinone;
1-benzyl-2-methyl-3-phenyl-6-sulfamyl-7-chloro-1,2,3,4-tetrahydro-4-quinazolinone;
1-benzyl-2-methyl-3-(2'-methyl-3'-chlorophenyl)-6-sulfamyl-7-chloro-1,2,3,4-tetrahydro-4-quinazolinone;
1-benzyl-2-methyl-3-(p-chlorophenyl)-6-methylaminosulfonyl-7-chloro-1,2,3,4-tetrahydro-4-quinazolinone;
1-benzyl-2-methyl-3-(2'-methylbenzyl)-6-sulfamyl-7-chloro-1,2,3,4-tetrahydro-4-quinazolinone;
1-benzyl-2-phenyl-3-o-tolyl-6-sulfamyl-7-chloro-1,2,3,4-tetrahydro-4-quinazolinone;
1-benzyl-2-propyl-3-o-tolyl-6-sulfamyl-7-chloro-1,2,3,4-tetrahydro-4-quinazolinone;
1-benzyl-2-butyl-3-o-tolyl-6-sulfamyl-7-trifluoromethyl-1,2,3,4-tetrahydro-4-quinazolinone;
1-benzyl-2-butyl-3-o-tolyl-6-sulfamyl-7-chloro-1,2,3,4-tetrahydro-4-quinazolinone;
1-benzyl-2-butyl-3-o-tolyl-6-sulfonyl-7-trifluoromethyl-1,2,3,4-tetrahydro-4-quinazolinone;
1-benzyl-2-benzylthiomethyl-3-o-tolyl-6-sulfamyl-7-chloro-1,2,3,4-tetrahydro-4-quinazolinone;
1-benzyl-2-(2,2,2-trifluoroethylthiomethyl)-3-o-tolyl-6-sulfamyl-7-chloro-1,2,3,4-tetrahydro-4-quinazolinone;
1-benzyl-2-ethylthiomethyl-3-o-tolyl-6-sulfamyl-7-chloro-1,2,3,4-tetrahydro-4-quinazolinone;
1-benzyl-2-chloromethyl-3-o-tolyl-6-sulfamyl-7-chloro-1,2,3,4-tetrahydro-4-quinazolinone;
1-benzyl-2-dichloromethyl-3-o-tolyl-6-sulfamyl-7-chloro-1,2,3,4-tetrahydro-4-quinazolinone;
1-benzyl-2-trichloromethyl-3-o-tolyl-6-sulfamyl-7-chloro-1,2,3,4-tetrahydro-4-quinazolinone;
1-benzyl-2-benzyl-3-o-tolyl-6-sulfamyl-7-chloro-1,2,3,4-tetrahydro-4-quinazolinone;
1-benzyl-2-(3'-sulfamyl-4'-chlorophenyl)-3-o-tolyl-6-sulfamyl-7-chloro-1,2,3,4-tetrahydro-4-quinazolinone;
1-benzyl-2-(3'-sulfamyl-4'-chloro-benzyl)-3-o-tolyl-6-sulfamyl-7-chloro-1,2,3,4-tetrahydro-4-quinazolinone;
1-benzyl-2-methyl-3-(o-hydroxyphenyl)-6-sulfamyl-7-chloro-1,2,3,4-tetrahydro-4-quinazolinone;
1-benzyl-2-methyl-3-(o-methoxyphenyl)-6-sulfamyl-7-chloro-1,2,3,4-tetrahydro-4-quinazolinone;

1-benzyl-2-methyl-3-(p-aminophenyl)-6-sulfamyl-7-chloro-1,2,3,4-tetrahydro-4-quinazolinone;
1-benzyl-2-methyl-3-(2'-methyl-4'-aminophenyl)-6-sulfamyl-7-chloro-1,2,3,4-tetrahydro-4-quinazolinone;
1-benzyl-2-methyl-3-(2'-methyl-3'-sulfamylphenyl)-6-sulfamyl-7-chloro-1,2,3,4-tetrahydro-4-quinazolinone;
1-p-chlorobenzyl-2-methyl-3-(2'-methyl-3'-sulfamylphenyl)-6-sulfamyl-7-trifluoromethyl-1,2,3,4-tetrahydro-4-quinazolinone;
1-benzyl-2-ethyl-3-(2'-methyl-3'-chlorophenyl)-6-sulfamyl-7-trifluoromethyl-1,2,3,4-tetrahydro-4-quinazolinone;
1-o-chlorobenzyl-2-methyl-3-(2'-methyl-3'-chlorophenyl)-6-methylamino-sulfonyl-7-chloro-1,2,3,4-tetrahydro-4-quinazolinone;
1-benzyl-2-ethyl-3-(2'-sulfamylphenyl)-6-sulfamyl-7-chloro-1,2,3,4-tetrahydro-4-quinazolinone;
1-benzyl-2-cyclopentylmethyl-3-o-tolyl-6-sulfamyl-7-chloro-1,2,3,4-tetrahydro-4-quinazolinone;
1-benzyl-2-cyclobutyl-3-o-tolyl-6-sulfamyl-7-chloro-1,2,3,4-tetrahydro-4-quinazolinone;
1-benzyl-2-cyclobutyl-3-o-tolyl-6-sulfamyl-7-trifluoromethyl-1,2,3,4-tetrahydro-4-quinazolinone;
1-benzyl-2-cyclopropylmethyl-3-o-tolyl-6-sulfamyl-7-chloro-1,2,3,4-tetrahydro-4-quinazolinone;
1-benzyl-2-cyclopropyl-3-o-tolyl-6-sulfamyl-7-trifluoromethyl-1,2,3,4-tetrahydro-4-quinazolinone;
1-benzyl-2-methyl-3-benzyl-6-sulfamyl-7-chloro-1,2,3,4-tetrahydro-4-quinazolinone;
1-o-chlorobenzyl-2-cyclopentyl-3-o-tolyl-6-sulfamyl-7-chloro-1,2,3,4-tetrahydro-4-quinazolinone;
1-benzyl-2-dimethyl-3-o-tolyl-6-sulfamyl-7-chloro-1,2,3,4-tetrahydro-4-quinazolinone;
1-benzyl-2-methyl-3-o-tolyl-6-sulfamyl-7-chloro-1,2,3,4-tetrahydro-4-quinazolinone;
1-benzyl-2-methyl-3-(2'-methyl-4'-chlorophenyl)-6-sulfamyl-7-chloro-1,2,3,4-tetrahydro-4-quinazolinone;
1-benzyl-2-cyclobutylmethyl-3-o-tolyl-6-sulfamyl-7-chloro-1,2,3,4-tetrahydro-4-quinazolinone;
1-benzyl-2-methyl-3(2'-trifluoromethyl-4'-aminophenyl)-6-sulfamyl-7-chloro-1,2,3,4-tetrahydro-4-quinazolinone;
the sodium salt of 1-benzyl-2-methyl-3-o-tolyl-6-sulfamyl-7-chloro-1,2,3,4-tetrahydro-4-quinazolinone;
and the potassium salt of 1-benzyl-2-methyl-3-o-tolyl-6-sulfamyl-7-chloro-1,2,3,4-tetrahydro-4-quinazolinone;
1-benzyl-2-methoxy-3-o-tolyl-6-sulfamyl-7-chloro-1,2,3,4-tetrahydro-4-quinazolinone;
1-benzyl-2-allyl-3-o-tolyl-6-sulfamyl-7-chloro-1,2,3,4-tetrahydro-4-quinazolinone, and
1-benzyl-2-acetylenyl-3-o-tolyl-6-sulfamyl-7-chloro-1,2,3,4-tetrahydro-4-quinazolinone.

The following table gives suitable diuretic compounds in tabular form:

TABLE

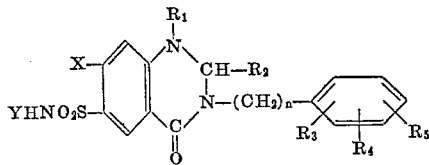

| $R_1$ | $R_2$ | $R_3$ | $R_4$ | $R_5$ | X | Y | n |
|---|---|---|---|---|---|---|---|
| PhCH$_2$ | Me | 2-Me | H | H | Cl | H | 0 |
| PhCH$_2$ | Me | H | H | H | Cl | H | 0 |
| PhCH$_2$ | Me | 2-Me | 3-Me | H | Cl | H | 0 |
| PhCH$_2$ | Me | 2-Me | 4-Cl | H | Cl | H | 0 |
| PhCH$_2$ | Me | 2-Me | 4-OH | H | Cl | H | 0 |
| PhCH$_2$ | Me | 2-Me | 4-NH$_2$ | H | Cl | H | 0 |
| PhCH$_2$ | Me | 2-Me | 3-Me | 4-Me | Cl | H | 0 |
| PhCH$_2$ | Me | 2-Me | H | H | F | H | 0 |
| PhCH$_2$ | Me | 2-Me | H | H | CF$_3$ | H | 0 |
| PhCH$_2$ | Me | 2-Me | H | H | Cl | Me | 0 |
| PhCH$_2$ | Me | 2-Me | H | H | Cl | Me | 1 |
| PhCH$_2$ | Me | 2-Me | H | H | Cl | Me | 2 |
| PhCH$_2$ | Me | 2-Me | H | H | Cl | Me | 3 |
| PhCH$_2$ | Et | 2-Me | H | H | Cl | H | 0 |
| PhCH$_2$ | Ph | 2-Me | H | H | Cl | H | 0 |
| PhCH$_2$ | Me | H | H | H | Cl | H | 0 |
| PhCH$_2$CH$_2$ | Me | 2-Me | H | H | Cl | H | 0 |
| PhCH$_2$CH$_2$ | Me | 2-Me | 4-Cl | H | Cl | H | 0 |
| PhCH$_2$CH$_2$ | Me | 2-Me | 4-OH | H | Cl | H | 0 |
| PhCH$_2$CH$_2$ | Me | 2-Me | 4-OMe | H | Cl | H | 0 |
| PhCH$_2$CH$_2$ | Me | 2-Me | 4-NH$_2$ | H | Cl | H | 0 |
| PhCH$_2$CH$_2$ | Me | 2-Me | 3-Me | H | Cl | H | 0 |
| PhCH$_2$CH$_2$ | Me | 2-Me | H | H | Cl | Me | 0 |
| PhCH$_2$CH$_2$ | Me | 2-Me | H | H | CF$_3$ | H | 0 |
| PhCH$_2$CH$_2$ | Et | 2-Me | H | H | Cl | H | 0 |
| CH$_2$-(2-Me-phenyl) | Me | 2-Me | H | H | Cl | H | 0 |
| CH$_2$-(3-Me-phenyl) | Me | 2-Me | H | H | Cl | H | 0 |
| CH$_2$-(4-Me-phenyl) | Me | 2-Me | H | H | Cl | H | 0 |
| CH$_2$-(3-Cl-phenyl) | Me | 2-Me | H | H | Cl | H | 0 |
| CH$_2$-(4-Cl-phenyl) | Me | 2-Me | H | H | Cl | H | 0 |

TABLE—Continued

| R₁ | R₂ | R₃ | R₄ | R₅ | X | Y | n |
|---|---|---|---|---|---|---|---|
| CH₂—⟨⟩—Cl | Me | 2-Me | H | H | Cl | H | 0 |
| CH₂—⟨⟩ (Et on ring, down) | Me | 2-Me | H | H | Cl | H | 0 |
| CH₂—⟨⟩ (Et on ring, up) | Me | 2-Me | H | H | Cl | H | 0 |
| CH₂—⟨⟩—Et | Me | 2-Me | H | H | Cl | H | 0 |
| CH₂CH₂—⟨⟩ (Me) | Me | 2-Me | H | H | Cl | H | 0 |
| CH₂CH₂—⟨⟩ (Me) | Me | 2-Me | H | H | Cl | H | 0 |
| CH₂CH₂—⟨⟩—Me | Me | 2-Me | H | H | Cl | H | 0 |
| CH₂CH₂—⟨⟩ (Cl) | Me | 2-Me | H | H | Cl | N | 0 |
| CH₂CH₂—⟨⟩ (Cl) | Me | 2-Me | H | H | Cl | H | 0 |
| CH₂CH₂—⟨⟩—Cl | Me | 2-Me | H | H | Cl | H | 0 |
| CH₂—⟨⟩—NH₂ | Me | 2-Me | H | H | Cl | H | 0 |
| CH₂—⟨⟩—OH | Me | 2-Me | H | H | Cl | H | 0 |
| CH₂—⟨⟩—OMe | Me | 2-Me | H | H | C. | H | 0 |
| CH₂—⟨⟩—SO₂NH₂ | Me | 2-Me | H | H | Cl | H | 0 |
| CH₂—⟨⟩—NHMe | Me | 2-Me | H | H | Cl | H | 0 |
| CH₂—⟨⟩—NMe₂ | Me | 2-Me | H | H | Cl | H | 0 |
| CH₂—⟨⟩—CH₂NH₂ | Me | 2-Me | H | H | Cl | H | 0 |
| CH₂—⟨⟩—CH₂CH₂NH₂ | Me | 2-Me | H | H | Cl | H | 0 |
| CH₂—⟨⟩—CH₂CH₂NMe₂ | Me | 2-Me | H | H | Cl | H | 0 |
| CH₂—⟨⟩—CH₂CH₂NHMe | Me | 2-Me | H | H | Cl | H | 0 |

Me=methyl. Et=ethyl. Ph=phenyl.

The following example entitled Example for Case 163L(A), is illustrative of the preparation of the compounds of the claims. Other compounds of the invention may be prepared by the method described below or by other methods such as the method disclosed in application Ser. No. 517,995.

EXAMPLE FOR CASE 163L(A)

Preparation of 1-benzyl-2-methyl-3-(o-tolyl)-6-sulfamyl-7-chloro-1,2,3,4-tetrahydro-4-quinazolinone Synthetic scheme:

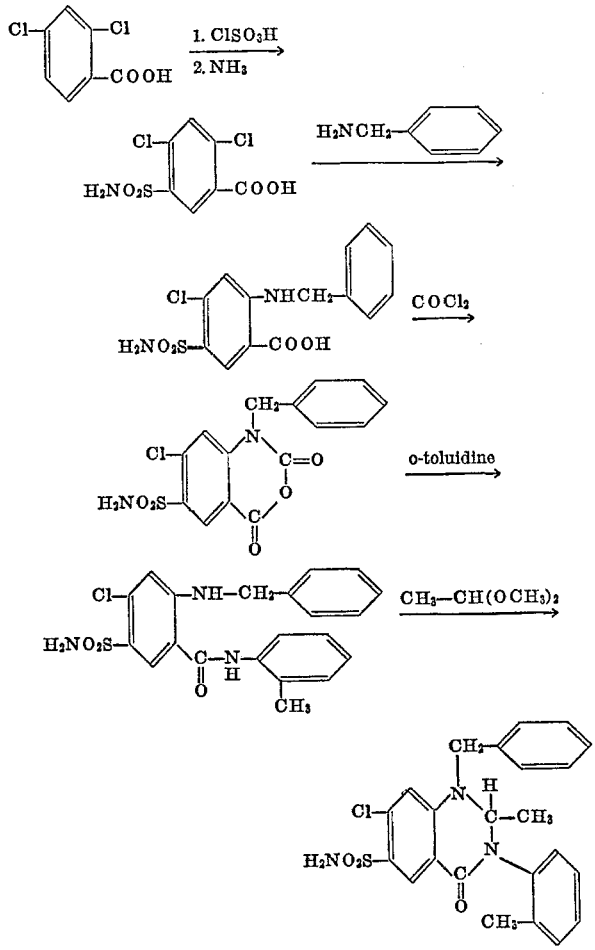

2,4-dichloro-5-sulfamylbenzoic acid.—To 4 kg. chlorosulfonic acid at room temperature was added 800 g. 2,4-dichloro benzoic acid. Reaction mixture brought to reflux, maintained 1½ hours, then allowed to cool down to 30° C. 8 kg. of ice and 5 l. of water were added cautiously. Mixture was cooled to 0° C., then 8. l. of 28% ammonium hydroxide was added. Reaction was acidified after 2 hours with hydrochloric acid. Solid was filtered off, water washed, and dried. Wt.=790 g. M.P.=223–8° C. Recrystallized from 5000 ml. water with charcoal. Wt.=560 g. M.P.=225–8° C.

4-chloro-5-sulfamyl-N-benzyl anthranilic acid.—To 500 ml. benzylamine was added 270 g. 2,4-dichloro-5-sulfamyl benzoic acid, using a 2 liter 3 necked flask. Temperature was quickly raised to 130° C., maintained 1 hour, then cooled to 100° C. Reaction mixture was poured into 5 liters ice water, acidified with 400 ml. HCl, stirred 4 hours, then filtered. The solid was recrystallized from 1 l. of 95% ethanol. Solid which separated on cooling was filtered off, air dried. Wt.=192 g. M.P.=242–6° C. (d).

4-benzyl-6-chloro-7-sulfamyl isatoic anhydride.—To 400 ml. acetic acid (glacial) was added 35.0 g. 4-chloro-5-sulfamyl-N-benzyl anthranilic acid and 15 ml. phosgene. Reaction mixture was stirred for 24 hours, then the solid was filtered off, ether washed and air dried. Wt.=25.2 g. Color—white.

2-benzylamino-4-chloro-5-sulfamyl-N-(o-tolyl)-benzamide.—25 g. of 4-benzyl-6-chloro-7-sulfamyl isatoic anhydride was added to 300 ml. o-toluidine at room temperature. Reaction mixture was quickly warmed to 190° C., maintained 5 minutes then allowed to cool. Cooled reaction mixture (50° C.) was poured into 3 liters ether. On standing, needles formed which were filtered, washed and dried.

1-benzyl-2-methyl-3-(o-tolyl)-6-sulfamyl-7-chloro-1,2,3,4-tetrahydro-4-quinazolinone.—To a heavy suspension of 5.3 g. 2-benzylamino-4-chloro-5-sulfamyl N-(o-tolyl)-benzamide in acetic acid was added 3.0 g. 1,1-dimethoxy ethane, then 4 drops $H_2SO_4$ over 5.0 minutes (one drop every 1–2 minutes). A solution formed; on continued stirring overnight a solid had separated. The solid was filtered off, ether washed and dried. The product was recrystallized twice from glacial acetic acid—the material from the second recrystallization was dried at 150° C. for 72 hours. Wt. 3.2 g. M.P. 193–5° C. Color—white.

Calculated for $C_{23}H_{22}ClN_3O_3S$: C, 60.59; H, 4.86; N, 9.22; Cl, 7.78; S, 7.03. Found: C, 60.45; H, 4.89; N, 9.33; Cl, 7.62; S, 6.94.

The other compounds of this invention can be made by modification of ingredients and quantities of the above example as is well understood by those skilled in the art.

From pharmacology tests run on 1-benzyl-2-methyl-3-o-tolyl-6-sulfamyl-7-chloro-1,2,3,4-tetrahydro-4-(3H)-quinazolinone (compound P) and other indications and analogy, the compounds of this invention are effective diuretics, saluretics, and antihypertensives with low toxicity. For example, the following is a summary of the pharmacology on compound P:

SUMMARY (a) Symptomatology and acute $LD_{50}$ in mice:
  Orally—$LD_{50} > 316$ mg./kg. (24 hours)
  Interperitoneal—$LD_{50} > 316$ mg./kg. (24 hours)

(b) Cardiovascular in dog: Doses intravenously up to 100 mg/kg. were administered. There were no changes in the cardiovascular system.

(c) Diuretic assay in rats: When administered by the oral route in initial assays measuring output of urine (ml./kg.), $Na+$, and $Cl^-$ (meq./kg.) at 4 hours and 21 hours after drug administration, compound P was found to promote water and salt loss, has a rapid onset and prolonged action, and appears to have a potency on volume diuresis about one-half that of hydrochlorothiazide and about one-half that of quinethazone.

The compound therefore is an effective and safe diuretic when administered in the same manner as hydrochlorothiazide and in the same or smaller dosage unit amounts.

Compound 756–698 (1-benzyl-2-methyl-3-(o-tolyl)-6-sulfamyl-7-chloro-1,2,3,4-tetrahydro-4-quinazolinone) was compared with hydrochlorothiazide for its diuretic, natriuretic and kaliuretic properties by a rat assay.

This compound has diuretic and natriuretic properties, but it is less potent than hydrochlorothiazide.

EXPERIMENTAL PROCEDURES

The basic assay method was that of Lipschitz, Hadidian, and Kerpcsar (J. Pharm. and Exp. Therap. 77:97) with minor modifications. Briefly, the method is as follows: four over-night fasted, Sprague-Dawley, albino rats were placed in each of ten stainless steel, nitric acid-washed metabolism cages. Two cages of animals were used as controls and were subjected to all procedures except dosing with compounds. All rats received an initial i.p. hydration of 2.5 cc. de-ionized water per 100 grams of animal weight. This was followed 2 hours later by 2.5 cc. of 0.9% saline per 100 g. of animal weight, as the disperse medium of 3% Clearjel disperse system, given by stomach tube. With this saline load, the compounds were suspended in the Clearjel disperse system by mixing in a Waring Blendor and also administered. Control animals received all substances except the compounds.

Urine was collected under light mineral oil for 4 hours and analyzed for volume, [Na+], [K+], and [Cl].

Appropriate calculations were done to convert the output of urinary volume, Na+, K+, and Cl− into mcl. or mceq./100 g. of rat weight/4 hr.

Compound 756–698, a white powdery substance, was received from the Pharmaceutical Chemistry Department in an amber bottle and stored in a refrigerator. Hydrochlorothiazide (HCTZ), was obtained from Merck, Sharp and Dohme Research Laboratory and refrigerated.

The doses in mg./kg. administered were as follows:

| HCTZ | 0.10 | 0.32 | 1.00 | 3.20 |
|---|---|---|---|---|
| 756–698 | 0.10 | 1.00 | 10.00 | 100.00 |

EXPERIMENTAL RESULTS

The various urinary outputs, calculated as described above, were plotted against the log of the doses. These dose-response curves (not shown) are for volume, Na+, K+, and Cl−, respectively.

For approximate potency comparisons, the distance between the steep portions of the dose-response curves were measured. Assigning a value of 1 for the responses to HCTZ, the potencies of 756–698 compared with HCTZ for the various parameters of renal function are as follows:

| Volume | 0.25. |
|---|---|
| Na+ | 0.50. |
| K+ | Approximately equal. |
| Cl− | 0.40. |

From these data compounds 756–698 has diuretic and natriuretic properties but is less potent than hydrochlorothiazide. Furthermore, the plateau for 756–698 occurs at lower doses than it does for hydrochlorothiazide.

No overt evidence of toxicity was seen in the test animals.

In the preceding specification the temperatures, wherever given, are in degrees centigrade.

Various modifications of the structural formula in column 1, lines 42–49, may be made, such as, for example, has been done for other tetrahydro-7-halo-6-sulfamyl-4-quinazolinones known to the art, without departing from the spirit of the invention which is concerned particularly with the aryl and alkaryl group on the 3-position, and an aralkyl such as benzyl or β-phenethyl or substituted aralkyl such as ortho-chlorobenzyl, or the like, in the 1-position.

It will also be understood that any of the groups of $R_2$ may be substituted for the 2 hydrogen of the heterocycle.

Likewise, therapeutically effective salts of the compounds of the invention may be made by methods known to the art, and are useful diuretics. For example, the sulfamyl group will react with bases to give sodium, potassium or ammonium salts of the quinazolinone compound. The basic nitrogen of the quinazolinone can be reacted with acids such as hydrochloric, maleic, tartaric, and the acidic ion exchange resins such as carboxylic acid, phosphonic acid, and sulfonic acid cation exchange resins to give the therapeutically effective and nontoxic salts of the quinazolinone compound.

I claim:
1. A compound of the formula

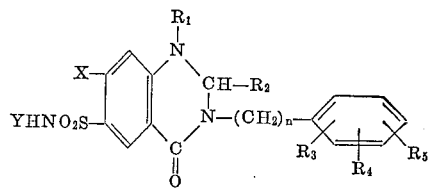

or the pharmaceutically acceptable salts thereof, in which X is halogen or trifluoromethyl, Y is hydrogen or loweralkyl, $R_1$ is phenylloweralkyl or substituted phenylloweralkyl in which the phenyl group is substituted by Cl, $NH_2$, OH, $OCH_3$, $CH_3$, $C_2H_5$, $SO_2NH_2$, $NHCH_3$, $N(CH_3)_2$; $R_2$ is hydrogen, loweralkyl, loweralkoxyalkyl, loweralkenyl, loweralkynyl, lowercycloalkyl, lowercycloalkylloweralkyl, thio loweralkyl, halogen substituted loweralkyl, phenylloweralkyl, or substituted phenylloweralkyl in which the phenyl substituent is hydroxy, lower alkoxy, loweralkyl, halogen, trifluoromethyl, sulfamyl or amino; $R_3$ is hydrogen, loweralkyl, hydroxy, loweralkoxy, $NH_2$, sulfamyl, halogen, or trifluoromethyl; $R_4$ and $R_5$ are any of the members of $R_3$, and $n$ is an integer from 0–4.

2. The compound of claim 1 wherein X is chlorine, Y is hydrogen, $R_1$ is benzyl, $R_2$ is methyl, $R_3$ is ortho-methyl, both $R_4$ and $R_5$ are hydrogen, and $n$ is 0.

3. The compound of claim 1 wherein X is chlorine, Y is hydrogen, $R_1$ is benzyl, $R_2$ is hydrogen, $R_3$ is ortho-methyl, both $R_4$ and $R_5$ are hydrogen, and $n$ is O.

4. The compound of claim 1 wherein X is chlorine, Y is hydrogen, $R_1$ is benzyl, $R_2$ is chloromethyl, $R_3$ is ortho-methyl, both $R_4$ and $R_5$ are hydrogen, and $n$ is 0.

5. The compound of claim 1 wherein X is chlorine, Y is hydrogen, $R_1$ is o-chlorobenzyl, $R_2$ is methyl, $R_3$ is ortho-methyl, both $R_4$ and $R_5$ are hydrogen, and $n$ is 0.

6. The compound of claim 1 wherein X is trifluoromethyl, Y is hydrogen, $R_1$ is benzyl, $R_2$ is methyl, $R_3$ is ortho-methyl, both $R_4$ and $R_5$ are hydrogen, and $n$ is O.

7. The compound according to claim 1 wherein the pharmaceutically acceptable salt is an alkali metal salt.

8. The compound of claim 1 wherein X, Y, $R_3$, $R_4$, $R_5$ and $n$ are the same as in claim 1, and $R_1$ is benzyl, beta phenethyl, or orthochlorobenzyl, and $R_2$ is hydrogen, loweralkyl, loweralkenyl, thioloweralkyl, halogen substituted loweralkyl, phenylloweralkyl, or substituted phenylloweralkyl in which the phenyl substituent is hydroxy, loweralkoxy, loweralkyl, halogen, trifluoromethyl, sulfamyl or amino.

References Cited

UNITED STATES PATENTS

| 3,217,001 | 11/1965 | Santilli et al. | |
|---|---|---|---|
| 3,280,187 | 10/1966 | Meyer et al. | |
| 3,284,450 | 11/1966 | Kraaijeveld et al. | |
| 3,291,794 | 12/1966 | Huebner. | |
| 3,314,956 | 4/1967 | Wolf et al. | |
| 3,360,518 | 12/1967 | Shetty | 260—256.5 |

FOREIGN PATENTS 692,082  4/1967  Belgium.

ALEX MAZEL, Primary Examiner.

R. J. GALLAGHER, Assistant Examiner.

U.S. Cl. X.R.

424—251